(12) United States Patent
Nguyen et al.

(10) Patent No.: US 10,289,423 B2
(45) Date of Patent: May 14, 2019

(54) MANAGEMENT CONTROLLER

(71) Applicant: HEWLETT PACKARD ENTERPRISE DEVELOPMENT LP, Houston, TX (US)

(72) Inventors: Vincent Nguyen, Houston, TX (US); Chanh V. Hua, Houston, TX (US); Ning Ge, Palo Alto, CA (US); Naveen Muralimanohar, Santa Clara, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 99 days.

(21) Appl. No.: 15/323,945

(22) PCT Filed: Oct. 31, 2014

(86) PCT No.: PCT/US2014/063527
§ 371 (c)(1),
(2) Date: Jan. 4, 2017

(87) PCT Pub. No.: WO2016/069011
PCT Pub. Date: May 6, 2016

(65) Prior Publication Data
US 2017/0199746 A1    Jul. 13, 2017

(51) Int. Cl.
*G06F 11/30* (2006.01)
*G06F 9/4401* (2018.01)
*G06F 1/3287* (2019.01)

(52) U.S. Cl.
CPC .......... *G06F 9/4406* (2013.01); *G06F 1/3287* (2013.01); *G06F 9/4401* (2013.01); *G06F 11/3058* (2013.01); *G06F 11/3089* (2013.01)

(58) Field of Classification Search
CPC .... G06F 9/4406; G06F 1/3287; G06F 9/4401; G06F 11/3058; G06F 11/3089
See application file for complete search history.

(56) References Cited

U.S. PATENT DOCUMENTS 6,771,538 B2    8/2004  Shukuri et al.
8,397,013 B1    3/2013  Rosenband et al.
(Continued)

FOREIGN PATENT DOCUMENTS

CN    101490645    7/2009
TW    200521849    7/2005
(Continued)

OTHER PUBLICATIONS

International Search Report and Written Opinion; PCT/US2014/063527; dated May 19, 2015; 10 pages.
(Continued)

*Primary Examiner* — Austin Hicks
(74) *Attorney, Agent, or Firm* — Hewlett Packard Enterprise Patent Department

(57) ABSTRACT

A system management controller with a consolidated memory is disclosed. The example computing device includes a processor to host an operating system and a system memory to be used by the processor to execute instructions. The computing device also includes a management controller to enable out-of-band management of the computing device. The management controller includes a consolidated memory device. A first memory block of the consolidated memory device is used by the management controller as a working memory and a second memory block of the consolidated memory device is used for long-term storage of programming instructions.

15 Claims, 7 Drawing Sheets

(56) References Cited

U.S. PATENT DOCUMENTS

| | | | |
|---|---|---|---|
| 2002/0087781 A1 | 7/2002 | Mukai et al. | |
| 2008/0077711 A1 | 3/2008 | Cepulis | |
| 2011/0153916 A1 | 6/2011 | Chinnaswamy et al. | |
| 2011/0283006 A1 | 11/2011 | Ramamurthy | |
| 2012/0173899 A1 | 7/2012 | Swindell | |
| 2013/0290607 A1 | 10/2013 | Chang et al. | |
| 2014/0032818 A1 | 1/2014 | Chang et al. | |
| 2014/0089558 A1* | 3/2014 | Baderdinni | G06F 12/0871 711/102 |
| 2014/0101653 A1 | 4/2014 | Dharmadhikari et al. | |
| 2015/0169447 A1* | 6/2015 | Stultz | G06F 11/1666 711/170 |

FOREIGN PATENT DOCUMENTS

| | | |
|---|---|---|
| TW | 201220046 | 5/2012 |
| TW | 201342186 | 10/2013 |
| WO | WO-2013147755 | 10/2013 |
| WO | WO-2013165383 | 11/2013 |

OTHER PUBLICATIONS

Wang, Y. et al., Memory Partitioning for Multidimensional Arrays in High-level Synthesis, (Research Paper), May 29-Jun. 7, 2013, 8 Pages.

* cited by examiner

500

MANAGEMENT CONTROLLER

BACKGROUND

Out-of-band management is a computer management technique that enables a system administrator to exercise full control of a computing device remotely. In out-of-band management, management instructions are received through a communication channel that bypasses the computing device's main processors. Management processes are performed by a specialized processor that does not run within the host operating system. In this way, management processes can be performed that would not normally be possible through the computer's host operating system. For example, out-of-band management enables an administrator to remotely turn on a computer, update a computer's Basic Input/Output System (BIOS), and monitor computer resources even while a computer's main processor is powered down.

BRIEF DESCRIPTION OF THE DRAWINGS

Certain examples are described in the following detailed description and in reference to the drawings, in which.

DETAILED DESCRIPTION OF SPECIFIC EXAMPLES

The techniques disclosed herein describe a management controller with a consolidated memory architecture. As used herein, the term management controller refers to an out-of-band management controller, which is also sometimes referred to as a baseboard management controller (BMC) or Integrated Lights-Out (iLO) management controller. The baseboard management controller operates outside of the host operating system, and therefore uses a different set of dedicated computing resources, including a processing, memory, data storage, and communication resources. The management controller described herein uses a consolidated memory device that provides the memory and data storage resources to be used by the management controller. The consolidated memory device reduces the number of separate memory devices in the computing device, which can reduce the circuit board footprint of such devices and solve space issues in some dense platforms. It also enables out-of-band accessibility and programmability to additional data and device firmware that may not otherwise be accessible. In some examples, the consolidated memory device is a memristor memory.

Figure 1A:
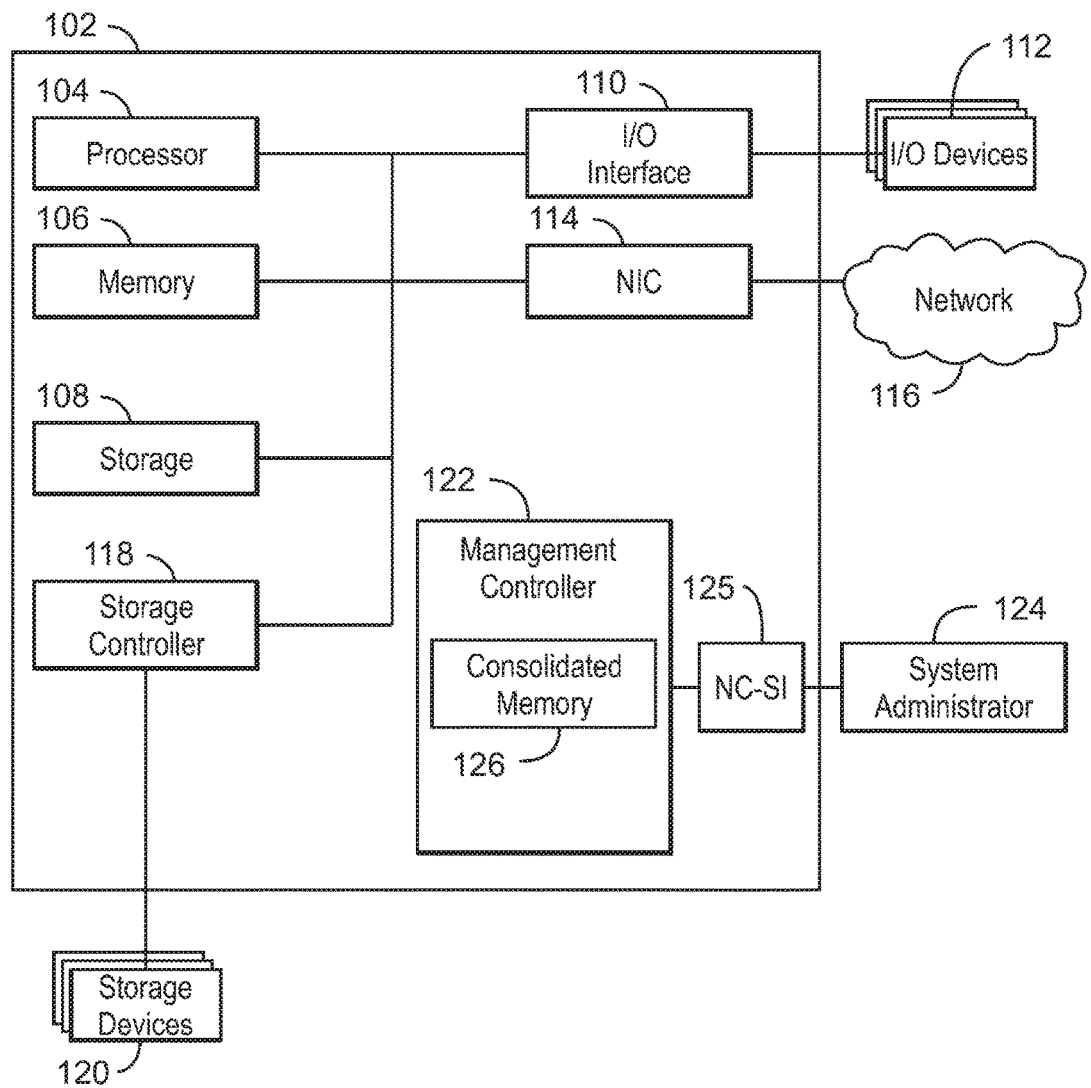
FIG. 1A is a block diagram of an example computing device that includes an out-of-band management controller with a consolidated memory.

FIG. 1A is a block diagram of an example computing device that includes an out-of-band management controller with a consolidated memory. The computing device is generally referred to by the reference number 102. The functional blocks and devices shown in FIG. 1A can include hardware elements such as circuitry or a combination of both hardware and software elements software elements including processors and computer code stored on a non-transitory, computer-readable medium. Additionally, the functional blocks and devices of the computing device 102 are only one example of functional blacks and devices that may be implemented in examples of the present techniques.

In some examples, the computing device 102 is a general-purpose computing device, for example, a desktop computer, laptop computer, business server, a blade server, and the like. The computing device 102 includes at least one processor 104. The computing device 102 can also have one or more types of tangible, non-transitory, computer-readable media, such as a system memory 106 that is used as a working memory. As used herein, the term working memory refers to the memory used by a processor during the execution of programming instructions. The system memory 106 can include Random Access Memory (RAM), including volatile memory such as Static Random-Access Memory (SRAM) and Dynamic Random-Access Memory (DRAM), non-volatile memory such as Resistive random-access memory (RRAM), and any other suitable memory types or combination thereof. The computing device 102 can also include other tangible, non-transitory, computer-readable storage media, such as a storage device 108 for the long-term storage of operating programs and data, including the operating programs and data such as user files. The processor 104 and the system memory 106 may be coupled together by any suitable number of buses, including 1, 2, 3, 4, 6, or more.

The processor 104 may be coupled to through a bus to an I/O interface 110. The I/O interface 110 may be coupled to any suitable type of I/O devices 112, including input devices, such as a mouse, touch screen, keyboard, display, and the like. The I/O devices 112 may also be output devices such as a display monitors.

The computing device 102 can also include a network interface controller (NIC) 114, for connecting the computing device 102 to a network 116. In some examples, the network 116 may be an enterprise network, which may be configured, for example, as a Storage Area Network (SAN), a Network Attached Storage (NAS), or other network configuration. The network 116 may also be a local area network (LAN), a wide-area network (WAN), or the Internet, for example. The processor can also be coupled to a storage controller 118, which may be coupled to one or more storage devices 120, such as a storage disk, a solid state drive, an array of storage disks, a network attached storage appliance, among others.

The computing device 102 also includes a management controller 122, which may be communicatively coupled to a system administrator 124. The management controller 122 can be coupled to the system administrator 124 through the network 116 or a separate communication channel such as an Ethernet via a Network Communications Service interface (NC-SI) 125, as shown in FIG. 1A. The management controller 122 enables the system administrator 124 to remotely monitor and control the computing device 102 through a dedicated, out-of-band management channel that does not rely on other components of the computing device 102 to operate. The management controller 122 provides management capabilities regardless of whether the computing device 102 is powered on or has an installed or functional operating system. The management controller 122 includes its own separate processing resources and memory, and can also include a separate back-up power supply.

The management controller 122 includes a consolidated memory 126, which can include working memory, and memory used far the long-term storage of programming instructions and other data, including firmware and software, configuration and version information, and log data among others. The consolidated memory 126 is a single memory device or multiple devices with a single memory controller and a single type of storage medium. In some examples, the storage medium of the consolidated memory 126 is a memristive storage medium. The consolidated memory 126 may be an embedded component of the management controller 122 or external to the management controller 122. In some examples, the consolidated memory 126 is the only memory device used by the management controller 122. Separate blocks of the consolidated memory 126 may be configured as read-write memory, read-only memory, and write-once memory as well as volatile or non-volatile memory. The consolidated memory 126 reduces platform cost and saves circuit board space by consolidating several memory devices into one memory pool. The consolidated memory 126 can be accessed out-of-band and is available during standby for better platform image manageability and update. The consolidated memory 126 is described further below in relation to FIG. 2.

It is to be understood that the block diagram of FIG. 1A is not intended to indicate that the computing device 102 is to include all of the components shown in FIG. 1A. Rather, the computing device 102 can include fewer or additional components not illustrated in FIG. 1A. In one example, the computing device 102 may include additional processors, memory controller devices, network interfaces, etc.

Figure 1B:
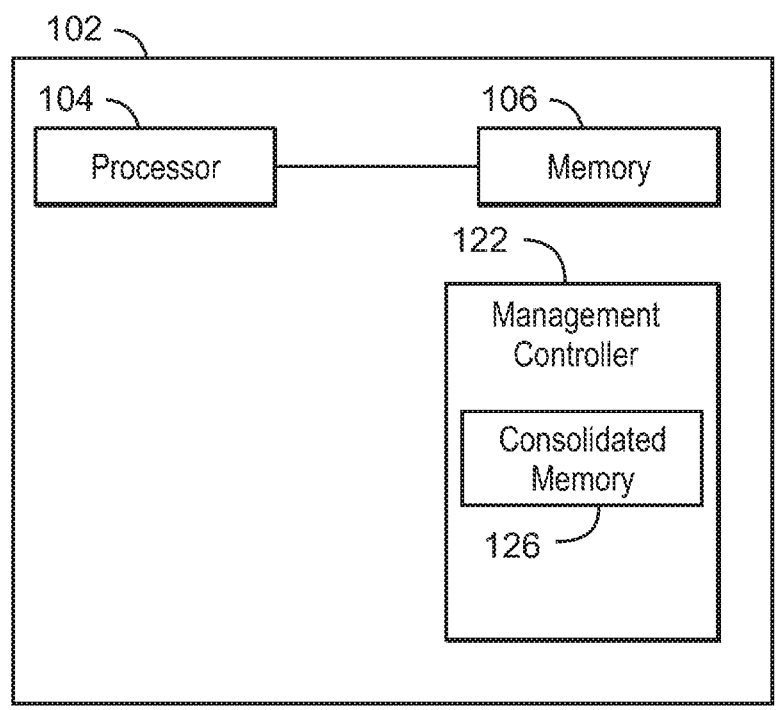
FIG. 1B is a block diagram showing a simplified example of a computing device that includes an out-of-band management controller with a consolidated memory.

FIG. 1B is a block diagram showing a simplified example of a computing device that includes an out-of-band management controller with a consolidated memory. As noted above, the computing device 102 can be a general-purpose computing device, for example, a desktop computer, laptop computer, business server, a blade server, and the like. The computing device 102 includes at least one processor 104. The computing device 102 can also have one or more types of tangible, non-transitory, computer-readable media, such as the system memory 106 that is used as a working memory. The processor 104 and system memory 106 may be coupled together by any suitable number of buses, including one or more.

The computing device 102 also includes the management controller 122, which enables a system administrator to remotely monitor and control the computing device 102 through a dedicated, out-of-band management channel. The management controller 122 includes the consolidated memory 126, which can include working memory, and memory used for the long-term storage of programming instructions and other data, including firmware and software, configuration and version information, and log data among others. An example of a management controller with consolidated memory 126 is described further in relation to FIG. 2.

Figure 2:
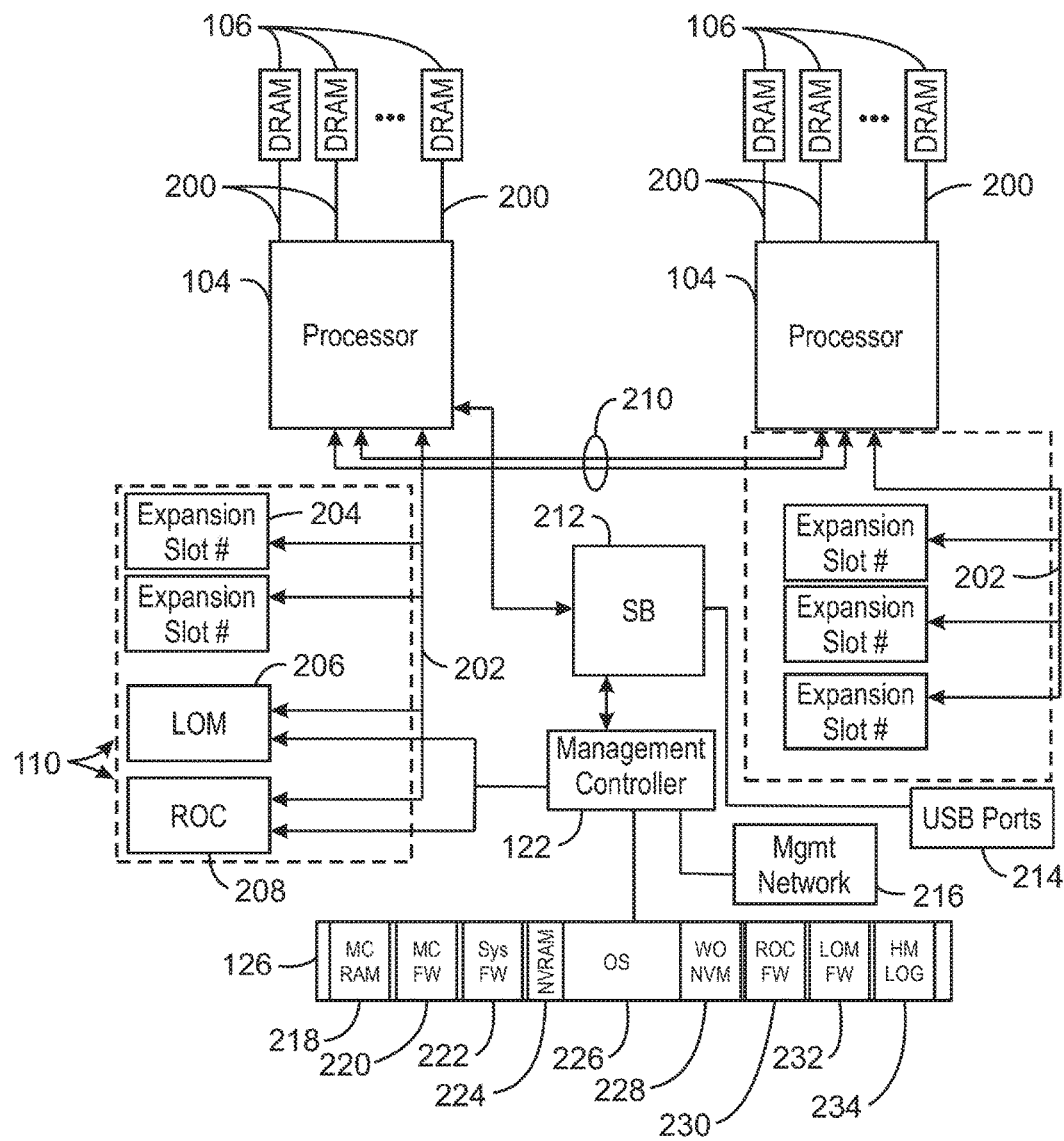
FIG. 2 is a block diagram of an example computing device showing more details of the out-of-band management controller with consolidated memory.

FIG. 2 is a block diagram of an example computing device showing more details of the out-of-band management controller with consolidated memory. The example computing device 102 shown in FIG. 2 includes two processors 104 that are adapted to execute stored instructions. However, the computing device 102 can include any suitable number of processors 104 including single core processors, multi-core processors, or any number of other configurations.

As shown in FIG. 2, each processor 104 is also linked to system memory 106 through one or more memory buses 200. As explained above, the system memory 106 provides the working memory for the processing operations of the processors 104. The memory buses 200 can be double data rate (DDR) busses, among others. In the example shown in FIG. 2, the system memory 106 is coupled directly to the processors 104, which have integrated memory controllers. However, it will be appreciated that other configurations are also possible. For example, the processors 104 may be coupled to the system memory 104 through an external memory controller.

Each processor 104 is connected to one or more the I/O interfaces 110 through a system bus 202. The system bus 202 may be a multi-drop bus or a point-to-point interface, such PCI Express®, or HyperTransport®, among others. The system bus 202 can be coupled to one or more expansion slots 204 for receiving I/O interface devices or other components. The system bus 202 can be coupled to one or more built-in components of the computing device 102, such as the I/O interface 110. The I/O interfaces 110 can include a network interface, such as a LAN-On-Motherboard (LOM) 206 and storage controller such as a Redundant Array of Independent Disks (RAID)-On-Card (ROC) 208. In some examples, the LAN-on-motherboard 206 and raid-on-card 208 are connected to the management controller through a SPI (Serial Peripheral Interface) bus, an I2C (Inter-Integrated Circuit) bus, or other bus types. Other I/O interface devices may also be included in the computing device 102 either in expansion slots 204 or as embedded components. The computing device 102 can also include one or more processor-to-processor connections 210, which enable communication between the processors 104 and sharing of memory 106 and other platform resources.

The computing device 102 also includes a Southbridge 212, which is coupled to at least one of the processors 104 through a communications link such as Direct Media. Interface (DMI). The Southbridge 212 serves various functions of the computing device 102, such as power management, system clocking, Direct Memory Access (DMA) to the system memory 106, Basic Input/Output System (BIOS), system initialization (Booting), and support for coupling peripheral devices. The Southbridge 212 can include an interface for communicating with Universal Serial Bus (USB) devices through USB ports 214.

The management controller 122 is coupled to the Southbridge by any suitable communication interface, such PCIe, USB, and others. The management controller 122 provides management, diagnostic, and configuration services for the computing device 102, such as system initialization, health monitoring, remote administrative control of the computing device 102, and the like. The management controller 122 controls access to the consolidated memory 126. During system initialization, the management controller 122 provides access to the consolidated memory 126 to enable the system resources to acquire system configuration information. The management controller 122 also receives system health and status information from system resources. For example, the management controller 122 can monitor temperature data, power usage, and system errors. The management controller 122 can log system health parameters to a portion of the consolidated memory 126. The management controller 122 also includes an interface, such as an Ethernet interface, for communicating over a network 216 out-of-band, enabling a system administrator to communicate with the management controller 122 to receive system information and initiate management operations, such as firmware updates, system power-up, system re-boot, and others.

The consolidated memory 126 shown in FIG. 2 includes several memory blocks, including a Management Controller Firmware (MC FW) 218 and Management Controller RAM (MC RAM) 220. The management controller firmware 218 contains the programming code that is executed by the management controller 122 in the performance of its functions. The management controller firmware 218 may be configured as a read-only memory. In some examples, the management controller 122 is configured to be able update the management controller firmware 218 in accordance with instructions and firmware updates received from the system administrator over the network 216. The management controller RAM 220 is the working memory that the management controller 122 uses in the performance of its functions. The management controller RAM 220 is configured as read-write memory and as volatile or non-volatile memory depending on applications.

The consolidated memory 126 also includes a System Firmware (Sys FW) 222, which defines the software interface between the operating system and other platform firmware. The System Firmware 22 is the first software being executed when the computing device 102 is powered on. The system firmware 222 includes the programming code to perform system discovery and to set up system resources after the computing device 102 powers on. The system firmware 222 can be Extensible Firmware Interface (EFI) firmware, Unified Extensible Firmware Interface (UEFI) firmware or Basic Input/Output System (BIOS) firmware, for example. The system firmware 222 may be configured as a read-only memory. In some examples, the management controller 122 is configured to be able update the system firmware 222 in accordance with instructions and firmware updates received from the system administrator over the network 216.

The consolidated memory can also include Non-Volatile RAM (NVRAM) 224. The non-volatile RAM 224 can be used to store configuration information generated during system initialization. For example, the devices discovered during system initialization and attributes of those devices can be stored to the non-volatile RAM 224 for use during subsequent power-ups of the computing device 102. In this way, the computing device 102 can boot up more quickly upon subsequent power-ups by reusing valid configuration information rather than reiterating the device discovery process. The non-volatile RAM 224 can also include a partition table that identifies the how the consolidated memory is partitioned. The partition table describes the location, size, and attributes of each of the memory blocks of the consolidated memory. The attributes identify what the block of memory is used for and whether the memory block is configured as read-only, read-write, write-once, for example.

The consolidated memory can also include an Operating System (OS) 226 of the computing device. The operating system 226 can be any suitable operating system including Microsoft Windows, Unix, Linux, or others. During system initialization, the operating system 226 is accessed by the processors 104 through the Southbridge 212 and the management controller 122 and loaded in the system memory 106. The operating system 226 can be configured as a read-write memory block and can be updated over the network 216 using the management controller 122.

The consolidated memory 126 can also include Write-Once Non-Volatile memory (WO NVM) 228, which can be used to store information about the computing device 102. For example, the write-once non-volatile memory 228 can include information about the computing device 102 hardware such the motherboard or backplane. The identifying information can include serial numbers, version information, model information, and information used to verify the authenticity of the hardware, among others. The information stored to write-once non-volatile memory 228 can be used during system initialization to help identify system components.

The consolidated memory 126 can also include RAID-On-Card Firmware (ROC FW) 230 and LAN-On-Motherboard Firmware (LOM FW) 232. The raid-on-card firmware 230 contains the programming code to be executed by the raid-on-card 208. The LAN-on-motherboard firmware 232 contains the programming code to be executed by the LAN-on-motherboard 206. During device initialization, the LAN-on-motherboard 206 and raid-on-card 208 can acquire their respective firmware through the management controller 122. In some examples, the management controller 122 is configured to be able update the raid-on-card firmware 230 and the LAN-on-motherboard firmware 232 in accordance with instructions and firmware updates received from the system administrator over the network 216. Firmware updates can be performed even when the computing device 102 is powered down.

The consolidated memory 126 can also include a Health Monitoring Log (HM Log) 234. The health monitoring log 234 is used to store data related to the health monitoring performed by the management controller 122. For example, health monitoring log 234 can store temperature data, power usage data, and system errors for monitored system components. The health monitoring can relate to any suitable system component or combination of components, including the processors 104, the memory devices 106, I/O interface devices 110, and others.

The management controller 122 partitions the consolidated memory 126 and defines attributes of the various memory blocks, including memory block size, which system resources are permitted to access which memory blocks, and the memory type of each memory block. As used herein, the memory type refers to whether the memory is configured to be used by the management controller 122 as read-only memory, read-write memory, or write-once memory. Some memory blocks may be fixed size, while other memory blocks may be variable. Variable-size memory blocks are configured so that the management controller 122 or a system administrator is able to adjust the size of the memory block. One example of variable-sized memory block is the health monitoring log, which can be adjusted to store a smaller or larger amount of log data. The fixed-size memory blocks are configured so that the size of the memory block is not adjustable. One example of a fixed-size memory block is the write-once non-volatile memory. In some examples, the management controller firmware 218, the management controller RAM 220, and the system firmware 222 are fixed-size memory blocks, and the remaining memory blocks are variable-sized.

The consolidated memory 126 shown in FIG. 2 includes all of the memory used by the management controller 122. However, in some examples, one or more of the memory blocks may be included in a separate memory device. It will also be appreciated that the consolidated memory 126 may include additional memory blocks not shown in FIG. 2, such as the programming information for a Complex Programmable Logic Device (CPLD) or a Field Programmable Gate Array (FPGA).

Figure 3:
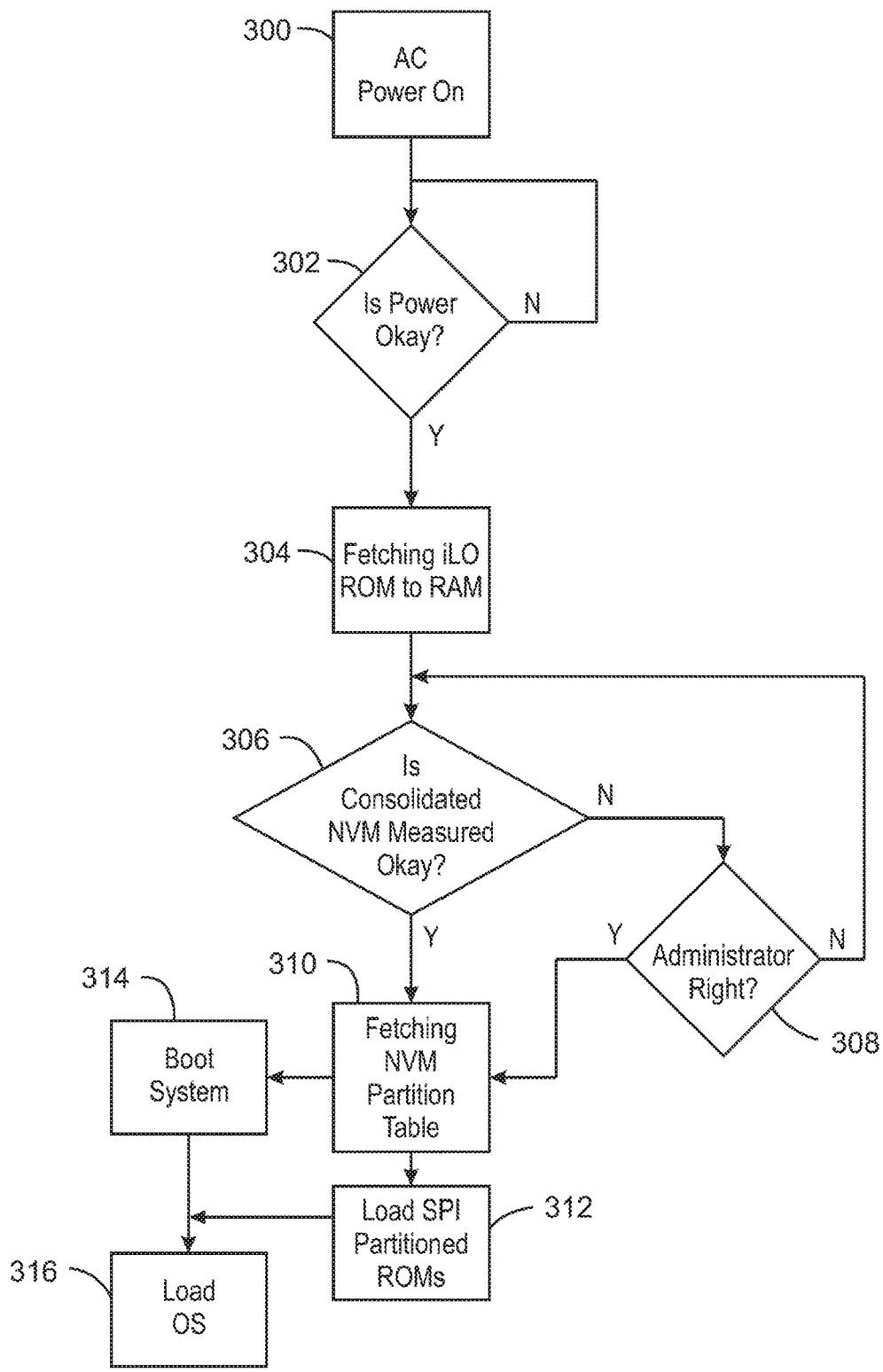
FIG. 3 is a process flow diagram of a method of starting up a computing device with an out-of-band management controller that includes a consolidated memory.

FIG. 3 is a process flow diagram of a method of starting up a computing device with an out-of-band management controller that includes a consolidated memory. The method 300 can be performed by the management controller 122 shown in FIGS. 1 and 2.

At block 300, the management controller detects the application of power to the computing device. The management controller can be configured to automatically begin the start-up process upon the detection of electrical power without waiting for instructions to power up.

At block 302, the management controller determines whether the electrical power is sufficient for proper operation of the computing device. Some components of the computing device's power supply, such as capacitors, acquire charge over time. The determination at block 302 ensures that the components of the power supply have been sufficiently charged. When the power is determined to be sufficient, the process flow advances to block 304.

At block 304, the management controller obtains the management controller firmware (also referred to as iLO ROM) and loads it into the management controller RAM. The remaining operations may be performed in accordance with the programming included in the management controller firmware.

At block 306, a determination is made regarding whether the management controller's consolidated memory is securely measured. The integrity measurement process ensures the security relevant content of the consolidated memory. It makes sure the consolidated memory content has not been modified or altered from the last boot sequences. If the consolidated memory measurement is changed, the process flow advances to block 308.

At block 308, the administrator privilege is required to allow compute system to continue the boot sequence. If the consolidated memory content measurement remains unmodified at block 306, the process flow advances to block 310. Blocks 306 and 308 are performed to ensure that the consolidated memory content is authenticated and secure.

At block 310, the management controller fetches the partition table for the consolidated memory. The partition table describes the location, size, and attributes of each of the consolidated memory's memory blocks, such as the operating system block, firmware blocks, and the like. After the partition table is obtained, the process flow advances to blocks 312 and 314, which may be performed in parallel.

At block 312, SPI partitioned ROMs are loaded to their respective components. The SPI ROMs can include the Raid-On-Card Firmware (ROC FW) 230 and LAN-On-Motherboard Firmware (LOM FW) 232 shown in FIG. 2.

At block 314, the computing device is booted using the system firmware 222 shown in FIG. 2. After the SPI partitioned ROMs are loaded and the computing device is booted, the process flow advances to block 316.

At block 316, the computing device's operating system 226 is loaded from the consolidated memory.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
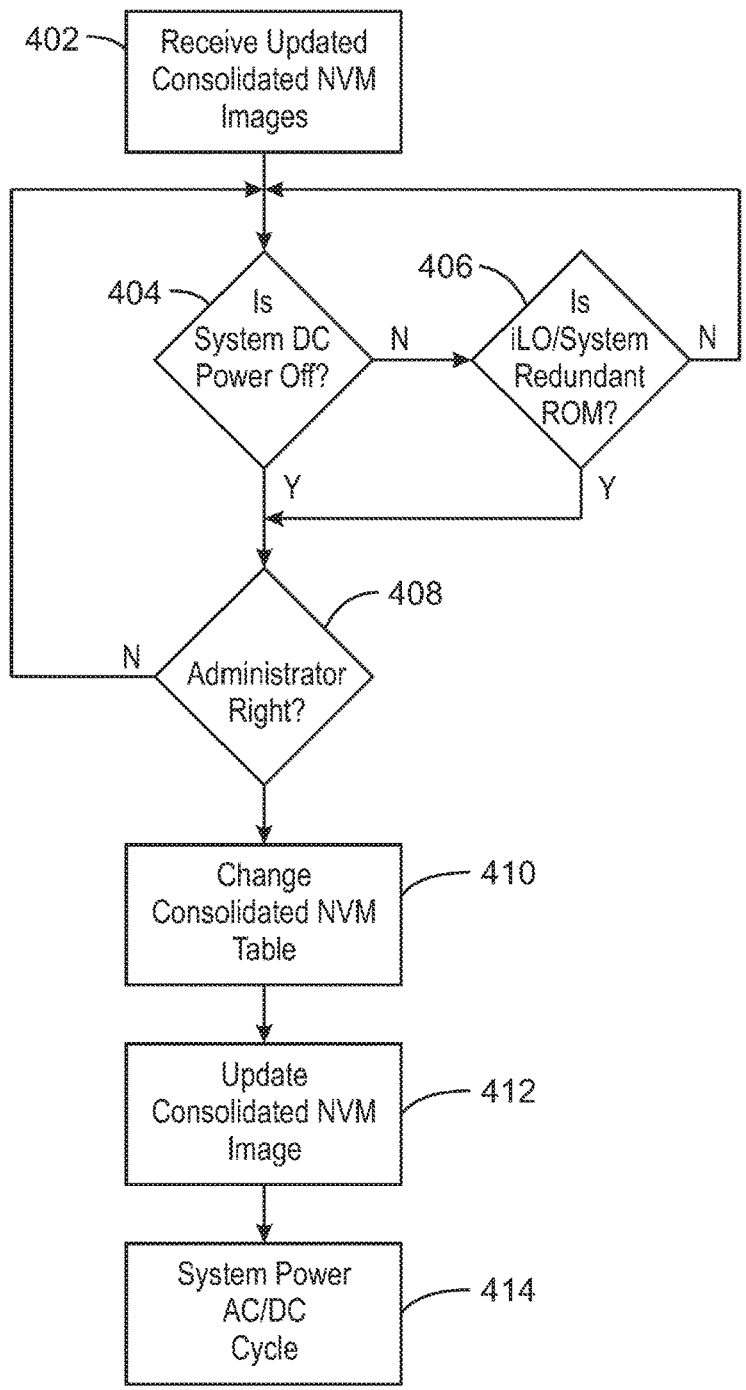
FIG. 4 is a process flow diagram of a method of updating the consolidated memory of an out-of-band management controller.

FIG. 4 is a process flow diagram of a method of updating the consolidated memory of an out-of-band management controller. The method 400 can be performed by the management controller 122 shown in FIGS. 1 and 2.

At block 402, the consolidated memory image update is received. The update may be received from a remote system administrator through a network connection. The image update may include updates to the operating system, system firmware, I/O device firmware such as the Raid-On-Card Firmware (ROC FW) 230 and LAN-On-Motherboard Firmware (LOM FW) 232 shown in FIG. 2, and any other component stored to the consolidated memory.

At block 404, a determination is made regarding whether the computing device's DC power is off. If the System DC power is not off, the process flow advances to block 406 to check for the redundant copy. In some examples, the image update process is only allowed in DC powered-on state if the specific partition in the consolidated memory has a redundant copy. The image update can be written to a backup partition while the computing device is running from the primary image.

At block 408, administrator privilege is required to alter the content or to change the mapping and attribute of the consolidated memory pool. Without administrator access rights, the process flow returns to block 404 and is halted. The determinations performed at blocks 404, 406, and 408 ensure that the security and integrity of the consolidated memory before allowing the process flow to block 410.

At block 410, the consolidated memory's partition table is updated to reflect the new configuration of the consolidated memory.

At block 412, the consolidated memory is updated with a new image. The consolidated memory is updated by overwriting the consolidated memory with the update received at block 402.

At block 414, the computing device's power is cycled off then on again. This restarts the management controller with the new image stored to the consolidated memory.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
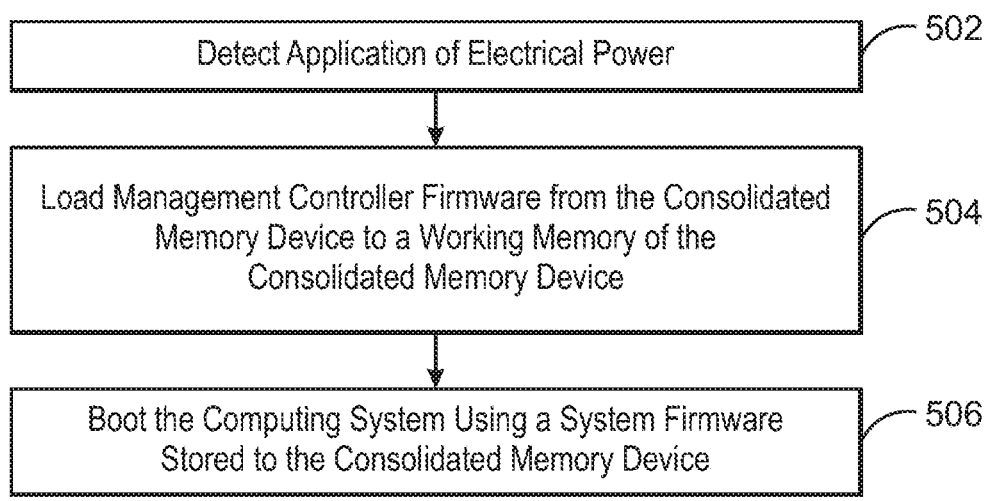
FIG. 5 is a process flow diagram summarizing a method of operating a computing device with an out-of-band management controller that includes a consolidated memory.

FIG. 5 is a process flow diagram summarizing a method of operating a computing device with an out-of-band management controller that includes a consolidated memory. The method 500 can be performed by the management controller 122 shown in FIGS. 1 and 2. At block 502, application of electrical power is detected by the management controller. At block 504, management controller firmware is loaded from a first block of a consolidated memory device to a working memory implemented in the consolidated memory device. At block 506, the computing device is booted using a system firmware stored to a second block of the consolidated memory device.

Figure 6:
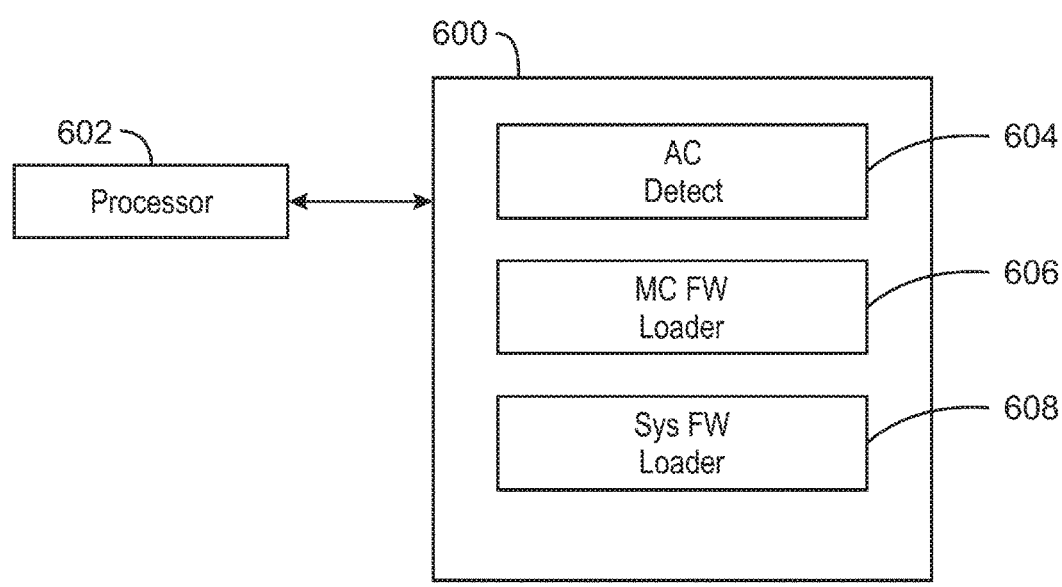
FIG. 6 is a block diagram showing a tangible, non-transitory, computer-readable medium that stores code configured manage a computing device.

FIG. 6 is a block diagram showing a tangible, non-transitory, computer-readable medium that stores code configured manage a computing device. The computer-readable medium is referred to by the reference number 600. The computer-readable medium 600 may include the consolidated memory 126 or a separate storage device that stores code to be transferred to the consolidated memory 126. The computer-readable medium 600 can include RAM, a hard disk drive, an array of hard disk drives, an optical drive, an array of optical drives, a non-volatile memory, a flash card or flash drive, a digital versatile disk (DVD), or a compact disk (CD), among others. The computer-readable medium 600 may be accessed by a processor 602, such as the management controller 122. Furthermore, the computer-readable medium 600 may include code configured to perform the methods described herein. For example, the computer readable medium 600 may include firmware that is executed by the management controller 122 shown in FIGS. 1-3.

The various data and programming code discussed herein may be stored on the computer-readable medium 600. A region 604 on the computer-readable medium 600 can include AC detect instructions, which detect application of electrical power to the computing system. A region 606 includes a Management Controller FirmWare (MC FW) loader that loads management controller firmware from a first memory block of a consolidated memory device to a working memory implemented in a second memory block of the consolidated memory device. A region 608 includes a System FirmWare (Sys FW) loader that boots the computing device using a system firmware stored to a third memory block of the consolidated memory device.

Although shown as contiguous blocks, the software components can be stored in any order or configuration. For example, if the tangible, non-transitory, computer-readable medium is a hard drive, the software components can be stored in non-contiguous, or even overlapping, sectors.

The present examples may be susceptible to various modifications and alternative forms and have been shown only for illustrative purposes. Furthermore, it is to be understood that the present techniques are not intended to be limited to the particular examples disclosed herein. Indeed, the scope of the appended claims is deemed to include all alternatives, modifications, and equivalents that are apparent to persons skilled in the art to which the disclosed subject matter pertains.

What is claimed is:

1. A computing device, comprising:
   a processor to execute a host operating system of the computing device;
   a system memory storing the host operating system to be executed by the processor;
   a management controller comprising a processing resource separate from the processor of the computing system; and
   a consolidated memory device separate from the system memory of the computing system, wherein access to the consolidated memory device is controlled only by the management controller,
   wherein the management controller partitions the consolidated memory device into memory blocks and adjusts sizes of the memory blocks based on an amount of log data,
   wherein one of the memory blocks of the consolidated memory device stores an operating system separate from the host operating system of the computing device, and
   wherein the management controller enables a remote administrative control of the computing device regardless of whether the computing device is powered down.

2. The computing device of claim 1, wherein a first memory block of the consolidated memory device is used by the management controller as a working memory and a second memory block of the consolidated memory device is used for long-term storage of programming instructions.

3. The computing device of claim 2, wherein the second memory block of the consolidated memory device comprises system firmware that defines software interface between the operating system and platform firmware.

4. The computing device of claim 1, wherein the operating system stored in one of the memory blocks of the consolidated memory device is to be loaded into the system memory to be the host operating system of the computing device.

5. The computing device of claim 2, wherein the second memory block of the consolidated memory device comprises firmware for an Input/Output (I/O) interface.

6. The computing device of claim 1, wherein the consolidated memory device consolidates data storage resources to be used by the management controller into an only one memory device for the management controller to use.

7. The computing device of claim 2, wherein the consolidated memory comprises a third memory block to store the log data related to health of the computing device.

8. A method of operating a computing device, comprising:
   executing, by a processor of the computing device, a host operating system, wherein the host operating system is stored in a system memory of the computing device;
   loading a management controller firmware into the computing device, wherein the management controller firmware includes a processing resource separate from the processor of the computing device;
   partitioning, by the management controller firmware, a consolidated memory device into memory blocks, wherein the consolidated memory device is separate from the system memory of the computing device and access to the consolidated memory device is controlled only by the management controller firmware;
   storing, in one of the memory blocks of the consolidated memory device, an operating system separate from the host operating system of the computing device;
   loading, by the management controller firmware, the operating system from one of the memory blocks of the consolidated memory device to the system memory to be the host operating system of the computing device;
   enabling, by the management controller firmware, a remote administrative control of the computing device regardless of whether the computing device is powered down; and
   booting, by the management controller firmware, the computing device using a system firmware stored in the consolidated memory device.

9. The method of claim 8, comprising obtaining a partition table from the consolidated memory device, wherein the partition table identifies a location and attributes of each memory block of the consolidated memory device.

10. The method of claim 8, comprising adjusting, by the management controller firmware, sizes of the memory blocks of the consolidated memory device based on an amount of log data.

11. The method of claim 8, comprising loading a firmware program from the consolidated memory device to an Input/Output (I/O) interface device coupled to a system bus of the computing device.

12. A tangible, non-transitory, computer-readable medium storing instructions that when executed cause a management controller firmware of a computing device to:
   partition a consolidated memory device into memory blocks, wherein the consolidated memory device is separate from a system memory of the computing device and access to the consolidated memory device is controlled only by the management controller firmware;
   store, in one of the memory blocks of the consolidated memory device, an operating system separate from a host operating system of the computing device;

load the operating system from one of the memory blocks of the consolidated memory device into the system memory to be the host operating system of the computing device;

enable a remote administrative control of the computing device regardless of whether the computing device is powered down; and boot the computing device using a system firmware stored in the consolidated memory device.

13. The tangible, non-transitory, computer-readable medium of claim 12, wherein the instructions are executed to cause the management controller firmware to obtain a partition table from the consolidated memory device, wherein the partition table identifies a location and attributes of each memory block of the consolidated memory device.

14. The tangible, non-transitory, computer-readable medium of claim 12, wherein the instructions are executed to cause the management controller firmware to adjust sizes of the memory blocks of the consolidated memory device based on an amount of log data.

15. The tangible, non-transitory, computer-readable medium of claim 12, wherein the instructions are executed to cause the management controller firmware to load a firmware program from the consolidated memory device to an Input/Output (I/O) interface device coupled to a system bus of the computing device.

* * * * *